US011702513B2

United States Patent
Omont et al.

(10) Patent No.: US 11,702,513 B2
(45) Date of Patent: Jul. 18, 2023

(54) AQUEOUS DISPERSION OF HYDROSOLUBLE OR HYDROSWELLABLE POLYMER

(71) Applicant: S.P.C.M. SA, Andrezieux-Boutheon (FR)

(72) Inventors: Alexandre Omont, Andrezieux (FR); Renaud Souzy, Andrezieux (FR); Marc-Edouard Michel, Andrezieux (FR); Bruno Sabot, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 363 days.

(21) Appl. No.: 17/023,974

(22) Filed: Sep. 17, 2020

(65) Prior Publication Data
US 2021/0079169 A1 Mar. 18, 2021

(30) Foreign Application Priority Data

Sep. 17, 2019 (FR) ..................................... 19 10225

(51) Int. Cl.
*C08J 3/07* (2006.01)
*C08K 3/30* (2006.01)
*C08K 3/32* (2006.01)

(52) U.S. Cl.
CPC .................. *C08J 3/07* (2013.01); *C08K 3/30* (2013.01); *C08K 3/32* (2013.01); *C08J 2333/26* (2013.01); *C08K 2003/3054* (2013.01); *C08K 2003/322* (2013.01)

(58) Field of Classification Search
None
See application file for complete search history.

(56) References Cited

U.S. PATENT DOCUMENTS

| 4,364,836 A | 12/1982 | Ziche |
| 4,883,536 A | 11/1989 | Burdick |
| 4,929,655 A | 5/1990 | Takeda et al. |
| 5,521,234 A | 5/1996 | Brown et al. |
| 5,837,776 A | 11/1998 | Selvarajan et al. |
| 6,639,066 B2 | 10/2003 | Karlsson et al. |
| 6,664,326 B1 | 12/2003 | Huang et al. |
| 9,127,235 B2 * | 9/2015 | Silvernail ............ C11D 3/3707 |
| 2002/0121224 A1 | 9/2002 | Bostrom et al. |
| 2005/0245414 A1 * | 11/2005 | Baldridge .............. C11D 3/381 510/276 |
| 2019/0000075 A1 | 1/2019 | Omont et al. |
| 2019/0330517 A1 | 10/2019 | Favero et al. |

FOREIGN PATENT DOCUMENTS

| AU | 2009284168 A1 * | 2/2010 |
| CA | 2599882 A * | 9/2016 |
| CN | 101161691 A | 4/2008 |
| WO | WO-00/01757 | 1/2000 |

OTHER PUBLICATIONS

Preliminary Search Report for Corresponding French Application No. 1910225, dated May 18, 2020.

* cited by examiner

*Primary Examiner* — Tae H Yoon
(74) *Attorney, Agent, or Firm* — B. Aaron Schulman, Esq.; Stites & Harbison, PLLC

(57) ABSTRACT

The present invention concerns an aqueous dispersion comprising particles of water-soluble polymer of average molecular weight higher than or equal to 0.5 million daltons, or of water-swellable polymer, and a mixture of at least one sulfate salt and at least one phosphate salt in weight proportions of between 25:75 and 75:25.

9 Claims, No Drawings

AQUEOUS DISPERSION OF HYDROSOLUBLE OR HYDROSWELLABLE POLYMER

CROSS-REFERENCE TO RELATED APPLICATION

This application claims priority to French Patent Application No. 19 10225, filed on Sep. 17, 2019, the content of which is hereby incorporated by reference in its entirety.

The present invention concerns water-soluble polymers (flocculants, thickeners) or water-swellable polymers in the form of an aqueous dispersion. More specifically, the subject of the invention is an aqueous dispersion comprising particles of water-soluble polymer of average molecular weight greater than 0.5 million daltons, or of water-swellable polymer, and a mixture of at least one phosphate salt and at least one sulfate salt.

Preferably, the phosphate salt is not a polyphosphate salt.

Preferably, the present invention does not use a polyphosphate salt.

Water-soluble polymers of high molecular weight (molecular weight typically greater than or equal to 0.5 MDa) (flocculants or thickeners) and water-swellable polymers are widely used in multiple applications such as the petroleum and gas industry, hydraulic fractionation, paper production processes, water treatment, sludge dewatering, building industry, mining industry, cosmetics, agriculture, textile industry and detergents.

For example, advantage is taken of the flocculant nature of water-soluble synthetic polymers of high molecular weight in the field of water treatment/sludge dewatering. After an optional coagulation step to destabilise the colloidal particles of a given water (similar to spheres of size less than 1 micrometre), flocculation represents the step at which the particles are grouped together in aggregates of high molecular weight to generate rapid sedimentation.

The thickening nature of these polymers can be used in the field of Enhanced Oil Recovery (EOR). The sweep efficacy of water injection is generally improved through the addition of water-soluble synthetic (co)polymers of high molecular weight. The expected and proven benefits of the use of these (co)polymers, via «viscosification» of injected water, are improved sweep and a reduction in viscosity contrast between the fluids, to control the mobility ratio thereof in the field and thereby to recover oil more rapidly and more efficiently. These (co)polymers increase the viscosity of the water.

Water-swellable polymers are able to absorb water up to several hundred times their own weight. They are therefore excellent water retainers. They are also used in multiple applications. For example, the practice of coating plant material with water-swellable polymer is of interest in agriculture. The coating of plant material with water-swellable polymer has the chief advantage of optimising the use of water and associated active substances.

These water-soluble or water-swellable polymers can be obtained in the form of an aqueous dispersion via a method known as aqueous dispersion polymerization. The polymer is polymerized directly in an aqueous solution comprising at least one compound selected from among a mineral salt, an organic salt, a dispersive organic polymer and mixtures thereof.

Another technique is to formulate a particulate polyphase dispersion of water-soluble or water-swellable polymer by dispersing solid particles of polymer in an aqueous solution comprising at least one compound selected from among a mineral salt and/or organic salt, a dispersive organic polymer, a viscosifying agent, optionally a mineral oil, and mixtures thereof (such as described in application WO2018154219).

However, irrespective of the technique used to obtain the aqueous dispersion of water-soluble or water-swellable polymers, the dispersion is particularly unstable.

The first reason for instability arises from the affinity of the polymers with the continuous aqueous phase and the need to attenuate the phenomenon of hydration to prevent gelling of the system. Attenuation will be all the more as the rate of incorporation of polymer into the aqueous phase is increased. The other reason results from insufficient suspension of the polymer particles, which in particular is governed by Stokes' law, in the continuous aqueous phase of these dispersions.

Two types of additives are routinely used for stabilisation:

Additives preventing the particles of water-soluble and/or water-swellable polymer from hydrating in contact with the continuous aqueous phase and hence causing gelling of the formulation. These are mainly ionic salts or species which prevent deployment of the polymer (1) via screening of the surface charges thereof and (2) via the ionic strength they generate in solution. Numerous salts are referenced, in particular halogenated salts such as $CaCl_2$), $CaBr_2$, but also various salts such as ammonium salts or even ionic dispersive polymers.

The salts can be combined with other additives such as swelling agents (gums, clays) allowing limited deployment of water-soluble polymers via a mechanism of steric hindrance.

Additives allowing the powder to be held in good dispersive state hence avoiding phenomena of sedimentation or creaming. All these additives act on the variables of Stokes' law (density, viscosity of the continuous phase). The first class of additives is that of salts allowing an increased suspensive effect via an increase in the density of the continuous phase. They are sometimes combined with rheological agents and preferably agents having thixotropic properties able to stop phenomena of sedimentation. Mention can be made of xanthan gums, hydroxyethylcellulose, attapulgite, laponite, hectorite.

The stabilisation of aqueous dispersions of water-soluble or water-swellable polymers remains an issue in particular on account of the imperfect dispersion of the polymer particles (problems of sedimentation or creaming) and limited rate of incorporation thereof in the dispersion.

The Applicant has surprisingly found that an aqueous dispersion of water-soluble and/or water-swellable polymer, containing a mixture of at least one sulfate salt and at least one phosphate salt in well-defined proportions, exhibits improved stability.

Preferably, the phosphate salt is not a polyphosphate salt.

Preferably, the present invention does not use a polyphosphate salt.

The polymer particles of this dispersion are more stable over time, which translates as reduced sedimentation and creaming. In addition, the threshold limit of active material that can be incorporated and dispersed in the formulation is higher. This threshold is defined by the limit on and after which destabilisation of the formulation is observed, which translates as gelling.

A first aspect of the invention is therefore an aqueous dispersion comprising particles of water-soluble polymer of average molecular weight greater than or equal to 0.5 million daltons, or of water-swellable polymer, and a mixture of at least one sulfate salt and at least one phosphate salt in weight proportions of between 25:75 and 75:25, preferably between 65:35 and 35:65.

Preferably, the phosphate salt is not a polyphosphate salt.

Preferably, the present invention does not use a polyphosphate salt.

A further aspect of the invention concerns the use of this aqueous dispersion of water-soluble or water-swellable polymer in the petroleum and gas industry, hydraulic fractionation, paper production processes, water treatment, sludge dewatering, building industry, mining industry, cosmetics, agriculture, textile industry and detergents.

Preferably, the phosphate salt is not a polyphosphate salt.

Preferably, the present invention does not use a polyphosphate salt.

Such as used herein, the term "water-soluble polymer" designates a polymer giving an aqueous solution without insoluble particles when dissolved under agitation for 4 hours at 25° C. and at a concentration of 20 g·L-1 in water.

This water-soluble polymer can be linear or structured. The term structured means that the polymer can be in the form of a branched polymer, in comb form or in star form.

A «water-swellable polymer», also known as a superabsorbent polymer has a water absorption capacity greater than 10 times its own volume. Particularly advantageously, in the aqueous dispersion of the invention the water-swellable polymer is not or is only scarcely water-swollen. Scarcely water-swollen means that it maintains a water absorption capacity greater than 10 times its own volume.

In the present invention, the "molecular weight" of the water-soluble polymer (i.e. the weight average molecular weight) is determined by measuring intrinsic viscosity. Intrinsic viscosity can be measured with methods known to persons skilled in the art and can be calculated in particular from values of reduced viscosity as a function of different concentrations using a graph method by plotting the values of reduced viscosity (along the Y-axis) against concentrations (along the X-axis) and extrapolating the curve to zero concentration. The value of intrinsic viscosity is read along the Y-axis or using the least squares method. The weight average molecular weight can then be determined using the well-known Mark-Houwink equation:

$$[\eta] = K\,M\alpha;$$

[η] represents the intrinsic viscosity of the polymer, determined by the method measuring viscosity in solution;

K represents an empirical constant;

M represents the molecular weight of the polymer;

α represents the Mark-Houwink coefficient;

α and K are dependent on the particular polymer-solvent system.

The water-soluble polymer contained in the aqueous dispersion of the invention has an average molecular weight greater than or equal to 0.5 million daltons. Preferably, the average molecular weight is between 0.5 and 40 million daltons, more preferably between 5 and 30 million daltons.

The term «polymer» designates both homopolymers and copolymers with nonionic monomers and/or anionic monomers and/or cationic monomers and/or zwitterionic monomers.

Preferably, the water-soluble or water-swellable polymer is derived from at least one monomer selected from among water-soluble monomers comprising at least one double ethylene bond. These monomers can be anionic monomers, nonionic monomers, cationic monomers or zwitterionic monomers.

The anionic monomer comprising at least one double ethylene bond can be selected from among:
  monomers comprising at least one carboxylic function e.g. acrylic acid, methacrylic acid, itaconic acid and the salts thereof;
  monomers comprising at least one sulfonic acid function e.g. 2-acrylamido-2-methylpropane sulfonic acid (AMPS), allyl sulfonic acid and methallyl sulfonic acid, and the salts thereof.

The salts of anionic monomers are generally alkali metal, alkaline-earth or ammonium salts, preferably sodium or potassium salts.

The nonionic monomer comprising at least one double ethylene bond can be selected from among:
  acrylamide and derivatives thereof, in particular N-alkylacrylamides e.g. N-isopropylacrylamide, N-tert-butylacrylamide; N,N-dialkylacrylamides e.g. N,N-dimethylacrylamide; and N-methylolacrylamide;
  methacrylamide and derivatives thereof, in particular N-alkylmethacrylamides e.g. N-isopropylmethacrylamide, N-tert-butylmethacrylamide; N,N-dialkylmethacrylamides e.g. NN-dimethylmethacrylamide; and N-methylolmethacrylamide;
  N-vinylpyridine, N-vinylpyrrolidone, hydroxyalkyl acrylates, hydroxyalkyl methacrylates, acrylates carrying alkoxy chains, and methacrylates carrying alkoxy chains.

The cationic monomer comprising at least one double ethylene bond can be selected from among:
  diallyldialkyl ammonium salts e.g. diallyldimethylammonium chloride (DADMAC);
  acrylates of dialkylaminoalkyl, methacrylates of dialkylaminoalkyl, in particular dialkylaminoethyl acrylate (DAMEA), dialkylaminoethyl methacrylate (DAMEMA) and the acidified or quaternized forms thereof e.g. [2-(acryloyloxy)ethyl]trimethylammonium chloride; dialkylaminoalkylacrylamides, dialkyl-methacrylamides, and the acidified or quaternized forms thereof e.g. acrylamido-propyltrimethylammonium chloride.

The zwitterionic monomer comprising at least one double ethylene bond can be selected from among:
  sulfobetaine monomers such as sulfopropyl dimethylammonium ethyl methacrylate, sulfopropyl dimethylammonium propylmethacrylamide, sulfopropyl 2-vinylpyridinium;
  phosphobetaine monomers such as phosphatoethyl trimethylammonium ethyl methacrylate, carboxybetaine monomers.

The water-soluble or water-swellable polymer can be a copolymer prepared from the previously described monomers, or from the previously described monomers and at least one other monomer selected from among hydrophobic monomers e.g. styrene, alkyl-acrylates, alkyl-methacrylates, aryl-acrylates, aryl-methacrylates, hydrophobic derivatives of acrylamide; amphiphilic monomers e.g. dodecyl poly(oxyethylene) methacrylate, behenyl poly(oxyethylene) methacrylate; or from natural polymers such as cellulose derivatives, polysaccharides, clays.

Preferably, the water-soluble or water-swellable polymer is a homopolymer of acrylamide or methacrylamide.

According to a further preference, the water-soluble or water-swellable polymer is a copolymer of acrylamide or methacrylamide and of an anionic monomer selected from among acrylic acid, methacrylic acid, 2-acrylamido-2-methylpropane sulfonic acid, and the salts thereof.

According to a final preference, the water-soluble or water-swellable polymer is a copolymer of acrylamide or methacrylamide and of a cationic monomer selected from among quaternized dialkylaminoethyl acrylate (DAMEA), quaternized dialkylaminoethyl methacrylate (DAMEMA) diallyldimethylammonium chloride (DADMAC), acrylamido propyltrimethylammonium chloride (APTAC), and methacrylamido propyltrimethylammonium chloride (MAPTAC).

Preferably, the aqueous dispersion of the invention comprises between 5 and 60 weight %, preferably between 10 and 35 weight % of particles of water-soluble or water-swellable polymer relative to the total weight of the dispersion.

The particles of water-soluble or water-swellable polymer advantageously have a diameter allowing dispersion thereof. Preferably, the particles have a mean diameter ranging from 0.1 to 1000 µm, preferably from 0.1 to 500 µm. The mean diameter of the particles can be determined with any method known to persons skilled in the art e.g. by binocular microscopy.

In addition to the water-soluble or water-swellable polymer, the aqueous dispersion comprises a compound having a function of equilibrating agent. It is a water-soluble or water-miscible compound. In the dispersion of the invention, it fully or partly allows inhibited hydration of the polymer. Therefore, within this aqueous dispersion in the presence of this compound, the polymer is present in the form of particles The dispersion of the invention, as equilibrating agent, comprises a mixture of at least one sulfate salt and at least one phosphate salt in weight proportions of between 25:75 and 75:25, preferably between 65:35 and 35:65.

Preferably, the aqueous polymer dispersion comprises between 10 and 40 weight of a mixture of at least one sulfate salt and at least one phosphate salt relative to the total weight of the dispersion.

The sulfate salt can be selected from among alkali metal sulfates, alkali metal hydrogen sulfates, ammonium sulfate, ammonium hydrogen sulfate, magnesium sulfate, calcium sulfate and aluminium sulfate, or any other salt of sulfuric acid. The preferred sulfate salt is ammonium sulfate.

The phosphate salt can be selected from among alkali metal phosphates, alkali metal hydrogen phosphates, alkali metal dihydrogen phosphates, ammonium phosphate, diammonium hydrogen phosphate (ammonium hydrogen phosphate), ammonium dihydrogen phosphate, phosphates of alkaline-earth metals, hydrogen phosphates of alkaline-earth metals, dihydrogen phosphates of alkaline-earth metals and aluminium phosphate, or any other salt of phosphoric acid. The preferred phosphate salt is diammonium phosphate.

Preferably, the phosphate salt is not a polyphosphate salt.

Preferably, the present invention does not use a polyphosphate salt.

The preferred mixture of at least one sulfate salt and at least one phosphate salt is the mixture of ammonium sulfate and diammonium phosphate.

In addition to the mixture of at least one phosphate salt and at least one sulfate salt, the aqueous dispersions may comprise at least one compound having an equilibrating function selected from among:

mineral or organic salts comprising at least one anion selected from among the halides;

mineral or organic salts comprising at least one cation selected from among sodium, potassium, ammonium, magnesium, calcium, aluminium;

mixtures of at least two of these salts; such as polymers or copolymers containing acrylic acid, 2-acrylamido-2-methylpropane sulfonic acid, and the salts thereof, and acrylamide having a molecular weight ranging from 1000 to 30 000 daltons.

Advantageously, the aqueous dispersion of water-soluble or water-swellable polymer comprises from 10 to 40 weight % of mineral salt or organic salt, and from 5 to 30 weight of dispersive organic polymer relative to the total weight of the aqueous dispersion. It is to be understood that these percentages represent the percentage total weight of salts in the dispersion, therefore including the sulfate and phosphate salts.

Preferably, the dispersion comprises a dispersive organic polymer selected from among polymers having a molecular weight ranging from 500 to 100 000 daltons, preferably ranging from 1 000 to 50 000 daltons; more preferably ranging from 1 000 to 30 000 daltons.

Preferably, the dispersion contains less than 30 weight % of dispersive organic polymer, preferably from 5 to 20 weight %.

In the invention, the dispersion can also comprise at least one additive selected from among polyfunctional alcohols e.g. glycerol, polyethylene glycol and polypropylene glycol; polyalkylene glycols. Advantageously, the additive is contained in a weight amount of dispersion ranging from 0.001 to 20 weight %, preferably from 0.5 to 10 weight %.

The water-soluble or water-swellable polymers in aqueous dispersion form are obtained via aqueous dispersion polymerization in the presence of a mixture of at least one sulfate salt and at least one phosphate salt in weight proportions of between 25:75 and 75:25, preferably between 35:65 et 65:35, or by formulating the dispersion of water-soluble or water-swellable polymer by dispersing solid particles of polymer in an aqueous solution comprising a mixture of at least one sulfate salt and at least one phosphate salt in weight proportions of between 25:75 and 75:25, preferably between 35:65 and 65:35.

Without wishing to be bound by any theory, when preparing the dispersion via polymerization, the monomers are soluble in the aqueous solution comprising a mixture of at least one sulfate salt and at least one phosphate salt in weight proportions of between 25:75 and 75:25, preferably between 35:65 and 65:35, and the formed polymer is not soluble thereby forming the dispersion.

It is within the reach of persons skilled in the art to select and adapt operating conditions to optimise aqueous dispersion polymerization or formulation of the aqueous polymer dispersion.

In another aspect, the invention concerns the use of the aqueous dispersion comprising particles of water-soluble polymer of average molecular weight greater than or equal to 0.5 million daltons, or of water-swellable polymer, and a mixture of at least one sulfate salt and at least one phosphate salt in weight proportions of between 25:75 and 75:25, preferably between 35:65 and 65:35, in the petroleum and gas industry, hydraulic fractionation, paper production processes, water treatment, sludge dewatering, building industry, mining industry, cosmetics, agriculture, textile industry and detergents. In these applications, it is in particular the flocculating or thickening properties of which advantage is taken, or the water-retaining nature of water-swellable polymers.

The following examples illustrate the invention without limiting the scope thereof.

EXAMPLES

Example 1: Static, Suspensive, Stability at 20° C., of Aqueous Dispersions of Water-Swellable Acrylamide Homopolymers Containing Different AMS (Ammonium Sulfate)/DAP (Diammonium Phosphate) Ratios 350 g of aqueous polymer dispersion previously prepared via dispersion polymerization (weight concentration of polymer: 22%, and of AMS or AMS/DAP mixture: 25%) were placed in a glass tube (diameter: 50 mm, height: 300 mm). After one year, the height of the destabilised phase (creaming or sedimentation) was evaluated as a percentage in relation to the total initial height of aqueous dispersion.

TABLE 1

| Aqueous dispersion | AMS/DAP weight ratio | Stability | |
|---|---|---|---|
| A | 100:0 | Sedimentation | 50% |
| B | 40:60 | Creaming | 35% |
| C | 50:50 | Stable | 0% |
| D | 60:40 | Sedimentation | 31% |

The aqueous dispersion of water-swellable polymer is stable when prepared in a 50:50 AMS/DAP mixture. Stability remains reasonable for preparations in AMS/DAP mixtures of 60:40 or 40:60. The aqueous dispersion in unstable when prepared solely in the presence of AMS.

When compositions B and D are mixed after the stability study, the compositions become stable. Sedimentation is therefore reversible.

Example 2: Static, Suspensive Stability at 50° C., of Aqueous Dispersions of Polyacrylamides The following dispersions were prepared via aqueous solution polymerization.

Aqueous dispersion C: 22 weight % of water-swellable acrylamide homopolymer (Example 1), 25 weight % of AMS/DAP mixture (50:50 weight ratio).

Aqueous dispersion E: 22 weight % of water-soluble copolymer of acrylamide and sodium acrylate (70/30, mol %) of average molecular weight 15 million daltons, 20 weight of AMS.

Stability of dispersions C and E after 2 months was evaluated with the same method as in Example 1, at a temperature of 50° C.

TABLE 2

| Aqueous dispersion | Stability | |
|---|---|---|
| C | Stable | 0.1% |
| E | Sedimentn. | 50% |

For this study on accelerated stability (50° C., 2 months), an aqueous polymer dispersion in an AMS/DAP mixture of 50:50 weight ratio is more stable than a dispersion only containing AMS.

When composition E is mixed after the stability study, the composition does not become stable. Sedimentation is not reversible.

Example 3: Limit Incorporation Threshold of Active Material in an Aqueous Dispersion of Water-Swellable Acrylamide Homopolymers For following cases 1 and 2, the dispersions were prepared by aqueous dispersion polymerization. For each case, solely the weight concentration of polymer was changed. All the dispersions contained 25 weight % of salt (AMS or AMS/DAP mixture).

For each dispersion, Brookfield viscosity (model LV3 or LV4, 30 rpm-1, 25° C.) was measured and filterability was determined by passing the dispersion through a 300 μm filter.

Case 1: Aqueous Dispersions of Water-Swellable Polymer Containing AMS

TABLE 3

| Weight concentration of polymer (%) | Brookfield viscosity (cps) | Filterability |
|---|---|---|
| 22 | 800 | Filterable |
| 25 | 4300 | Non-filterable |
| 26.5 | 5000 | Non-filterable |

Case 2: Aqueous Dispersions of Water-Swellable Polymer Containing AMS/DAP (Weight Ratio 50:50).

TABLE 4

| Weight concentration of polymer (%) | Brookfield viscosity (cps) | Filterability |
|---|---|---|
| 22 | 500 | Filterable |
| 25 | 800 | Filterable |
| 26.5 | 1400 | Filterable |

Comparison of the results in Tables 3 and 4 evidences that a suitable AMS/DAP mixture allows a limited increase in viscosity and prevents agglomeration of the polymer particles (agglomeration makes dispersions non-filterable at 300 μm, gelling phenomenon) when the weight concentration of polymer is increased.

Example 4: Formulation and Evaluation of the Stability of an Aqueous Dispersion of Water-Soluble Polymer This example concerns the formulation of aqueous dispersions of water-soluble polymer P1 via dispersion of solid particles of said polymer in an aqueous solution. The final weight concentration of polymer is 10%.

a) Formulation of Dispersions of Water-Soluble Polymer

The water-soluble polymer P1 is a copolymer of acrylamide having overall cationicity of 10 mol %. The copolymer before formulation of the dispersion is in the physical form of a powder having a particle size of between 5 μm and 300 μm and dry matter of 90%.

Formulations of aqueous dispersions of polymer P1:

TABLE 5

| Ingredient | Quantity (weight %) | |
| --- | --- | --- |
| | Dispersion F | Dispersion G |
| Water | 47.58 | 47.59 |
| Ammonium sulfate (AMS) | 23.59 | 39.31 |
| Diammonium phosphate (DAP) | 15.73 | 0.00 |
| Attagel 50 (BASF) | 2.00 | 2.00 |
| Polymer P1 | 11.10 | 11.10 |
| Total | 100.00 | 100.00 |
| AMS/DAP ratio | 60:40 | 100:0 |
| P1 Concentration (weight %) | 10.0 | 10.0 | b) Evaluation of the Dynamic Stability of Aqueous Dispersions of Water-Soluble Polymer.

Dynamic stability was characterized by measuring the sedimentation rate.

The apparatus used was the LUMiSizer by LUM. LUMiSizer is an analytical centrifuge which, in accelerated fashion, is able to determine the stability of polymer dispersions. By means of a very high-performance optical system, the LUMiSizer can analyse heights or rates of sedimentation and/or creaming of solid polymer particles. Height is expressed in mm whilst rate is expressed in mm/month. The higher this value the lesser the stability of the dispersion.

TABLE 6

| Dispersion | | Sedimentation rate (mm/month) |
| --- | --- | --- |
| F | Invention | 19 |
| G | Reference | 31 |

This example shows that aqueous polymer dispersion F containing 10 weight % of cationic polymer and formulated with the AMS/DAP mixture (60:40) is more stable that dispersion G formulated solely with AMS.

Example 5: Formulation and Evaluation of the Stability of an Aqueous Dispersion of Water-Soluble Polymer This example concerns the formulation of aqueous dispersions of water-soluble polymer P1 by dispersing solid particles of said polymer in an aqueous solution. The final weight concentration of polymer was 20%.

a) Formulation of Dispersions of Water-Soluble Polymer

TABLE 7

| Ingredient | Quantity (weight %) | |
| --- | --- | --- |
| | Dispersion H | Dispersion I |
| Water | 40.82 | 40.82 |
| Ammonium sulfate (AMS) | 20.99 | 34.98 |
| Diammonium phosphate (DAP) | 13.99 | 0.00 |
| Attagel 50 (BASF) | 2.00 | 2.00 |
| Polymer P1 | 22.20 | 22.20 |
| Total | 100.00 | 100.00 |
| AMS/DAP ratio | 60:40 | 100:0 |
| P1 concentration (weight %) | 20.0 | 20.0 | b) Evaluation of the Dynamic Stability of Aqueous Dispersions of Water-Soluble Polymer.

Dynamic stability was characterized by measuring the sedimentation rate (as in Example 4).

TABLE 8

| Dispersion | | Sedimentation rate (mm/month) |
| --- | --- | --- |
| H | Invention | 14 |
| I | Reference | 27 |

This new example shows that the aqueous dispersion of polymer H containing 20 weight % of cationic polymer and formulated with the AMS/DAP mixture (weight ratio: 40:60) is again more stable than dispersion I formulated solely with AMS.

The invention claimed is:

1. An aqueous dispersion comprising particles of a water-soluble polymer of average molecular weight greater than or equal to 0.5 million daltons, or of a water-swellable polymer, and a mixture of at least one sulfate salt and at least one phosphate salt in weight proportions of between 25:75 and 75:25, the water-soluble or water-swellable polymer being a homopolymer of acrylamide or methacrylamide, or of a copolymer of acrylamide or methacrylamide and of an anionic monomer selected from the group consisting of acrylic acid, methacrylic acid, 2-acrylamido-2-methylpropane sulfonic acid and the salts thereof, or of a copolymer of acrylamide or methacrylamide and of a cationic monomer selected from the group consisting of quaternized dialkylaminoethyl acrylate (DAMEA), quaternized dialkylaminoethyl methacrylate (DAMEMA), diallyldimethylammonium chloride (DADMAC), acrylamido propyltrimethylammonium chloride (APTAC), and methacrylamido propyltrimethylammonium chloride (MAPTAC),
wherein the mixture of at least one sulfate salt and at least one phosphate salt is a mixture of ammonium sulfate and diammonium phosphate; and
wherein the phosphate salt is not a polyphosphate salt.

2. The aqueous dispersion according to claim 1, wherein it comprises between 5 and 60 weight % of the particles of water-soluble or water-swellable polymer.

3. The aqueous dispersion according to claim 1, wherein it comprises between 10 and 40 weight % of the mixture of at least one sulfate salt and at least one phosphate salt.

4. The aqueous dispersion according to claim 1, wherein the aqueous dispersion comprises the mixture of at least one sulfate salt and at least one phosphate salt in weight proportions of between 65:35 and 35:65.

5. The aqueous dispersion according to claim 1, wherein the water-soluble polymer has an average molecular weight of between 0.5 and 40 million daltons.

6. The aqueous dispersion according to claim 1, wherein the polymer particles have a mean diameter ranging from 0.1 to 1000 μm.

7. The aqueous dispersion according to claim 1, wherein said aqueous dispersion comprises a dispersive organic polymer selected from among polymers of molecular weight ranging from 500 to 100 000 daltons.

8. The aqueous dispersion according to claim 7, wherein it comprises less than 30 weight % of the dispersive organic polymer.

9. A method comprising using the aqueous dispersion according to claim 1 for a use selected from the group consisting of in the petroleum and gas industry, hydraulic fractionation, paper production processes, water treatment, sludge dewatering, building industry, mining industry, cosmetics, agriculture, textile industry, and detergents.

\* \* \* \* \*